Nov. 8, 1960 E. C. GREANIAS ET AL 2,959,769

DATA CONSOLIDATION SYSTEMS

Filed Dec. 29, 1958 3 Sheets-Sheet 1

INVENTORS
EVON C. GREANIAS
ARTHUR HAMBURGEN
JOHN J. LEIMER
BY Paul M. Brannen
AGENT Nov. 8, 1960 A. BODENSCHATZ 2,959,760

ADAPTATION OF A BLISTER TYPE DISCONNECT MEANS

Filed Sept. 26, 1955 2 Sheets-Sheet 2

INVENTOR.
AUGUST BODENSCHATZ

BY Ostrolenk, Faber, Gerb & Soffen
ATTORNEYS

Nov. 8, 1960 E. C. GREANIAS ET AL 2,959,769

DATA CONSOLIDATION SYSTEMS

Filed Dec. 29, 1958 3 Sheets-Sheet 3

United States Patent Office 2,959,769

Patented Nov. 8, 1960

2,959,769

DATA CONSOLIDATION SYSTEMS

Evon C. Greanias, Binghamton, and Arthur Hamburgen and John J. Leimer, Endicott, N.Y., assignors to International Business Machines Corporation, New York, N.Y., a corporation of New York Filed Dec. 29, 1958, Ser. No. 783,528

10 Claims. (Cl. 340—149)

This invention relates to data consolidation systems for use in conjunction with pattern scanning systems, and particularly to improved data consolidation systems for consolidating scanning data obtained by scanning patterns to be recognized, to obtain a reduced amount of data for subsequent analysis.

It has previously been proposed to provide pattern recognition circuits in which the patterns to be recognized are scanned by means of a very small scanning spot. The use of a very small scanning spot is advantageous for supplying adequate scanning signals when scanning lines of weak pattern, apparently because such lines, when considered microscopically, actually consist of dark ink portions deposited in small scattered areas, and thus a very fine scanning spot will cover such areas only, while a larger spot will also cover the lighter areas between the small dark areas, so that the signal is diluted.

However, the use of a small scanning spot is not without attendant difficulties. The major disadvantage is that the amount of data which must be processed is greatly increased, if it is assumed that the scanning signals are analyzed directly. Also, if the data is analyzed in its raw or unconsolidated form, it could be misleading for certain patterns in that it could indicate a light area in portions of a pattern which should be considered as a dark area, so that marginal patterns would provide ambiguous outputs.

Previously, it has been proposed to consolidate data obtained by fine spot scanning by determining whether or not, within a specified time interval, there was or was not a predetermined number of scanning signals supplied as a result of scanning a dark area. In other words, the data obtained over a predetermined time interval as the spot scanned a predetermined number of incremental areas must have indicated the fact that portions of a character were sensed for a predetermined percentage of the time interval before a desicision was made that the entire area scanned during this period is to be considered as a black area.

The present invention is an improvement over the arrangements previously proposed in that it makes use of additional criteria for determining when a particular scanning zone or cell is to be considered all black or all white. Such additional criteria can include the relative location of the black signals within the consolidation interval, or cell, and the consolidated information obtained for a previous interval, such as the next adjacent cell in either a horizontal or vertical direction. This information is combined by suitable logic circuits to provide a consolidated data output to be subsequently analyzed.

Briefly described, the invention contemplates a pattern recognition system in which the scanning of patterns is accomplished by a succession of short scans in one coordinate, successively disposed in the other coordinate, e.g., a plurality of short horizontal scans, which are successively displaced vertically, to form what may be termed a tall narrow raster. The video signal obtained during the scanning are supplied to a plurality of circuits which are arranged to integrate the signals over a predetermined time, determined by synchronizing signals which are coordinated with the scanning so that a predetermined number of short scans will be representative of a discrete area, or cell, within the raster. Suitable clipping circuits are provided to determine which if any of the integrated signals are of sufficient amplitude to constitute a valid value for the the quantity being measured, and if sufficient, an associated storage device, such as an electronic trigger, or an electronic latch, is set to indicate that the value has been attained. At a predetermined time, a zone or interval pulse samples the outputs of the storage devices, as combined in appropriate logic circuits, to thereby pass on to the recognition circuitry a consolidated video signal if the conditions which determine a black area have been met. An important feature of the invention is the use of signals in consolidation logic circuitry which reflect the consolidated signal obtained for previous cells or scan intervals, to thereby influence the signal provided for the present cell or scan interval.

It is accordingly an object of the present invention to provide an improved data consolidation system which consolidates the scanning signals during a predetermined interval according to a plurality of different criteria.

Another object of this invention is to provide an improved data consolidation system in which the scanning signals are consolidated for a predetermined number of elemental scans, by comparing the integrated value of the signals with a plurality of different fixed reference values, each representing a different minimum criterion, and providing an output signal only when a particular combination of the integrated value of the signals exceeds the reference values associated therewith.

Another object of the invention is to provide an improved data consolidation system in which the integrated data from a present scanning interval is compared with the consolidated data from at least one previous interval to determine the value of the present interval data.

A further object of the invention is to provide an improved data consolidation system in which the integrated data from a present scanning interval is compared with the consolidated data from the adjacent previous scanning intervals in both scanning coordinates to determine the value of the present interval data.

Another object of this invention is to provide an improved data consolidation system in which the integrated data from a present scanning interval is compared with the integrated data from the adjacent intervals to determine the value of the present interval data.

A further object of this invention is to provide an improved data consolidation system in which sampled data from a present scanning interval is compared with the consolidated data from previous intervals to determine the value of the present interval data.

Still another object of this invention is to provide an improved data consolidation system in which sampled data from a present scanning interval is compared with the integrated data from adjacent intervals to determine the value of the present interval data.

Another object of this invention is to provide an improved data consolidation system in which sampled data from a present scanning interval is compared with the sampled data from adjacent intervals to determine the value of the present interval data.

Yet another object of the invention is to provide an improved data consolidation system in which the integrated data from a present scanning interval is compared with the consolidated data from previous scanning intervals in both scanning coordinates to determine the presence of portions of meaningful patterns in the present scanning interval.

A broad object of the invention is to provide an improved data consolidation system.

Other objects of the invention will be pointed out in the following description and claims and illustrated in the accompanying drawings, which disclose, by way of examples, the principle of the invention and the best mode, which has been contemplated of applying that principle.

In the drawings:

Fig. 2 is a diagrammatic view of a first embodiment of a data consolidation system in accordance with the present invention.

Similar reference characters refer to similar parts in each of the several views.

Figure 1:
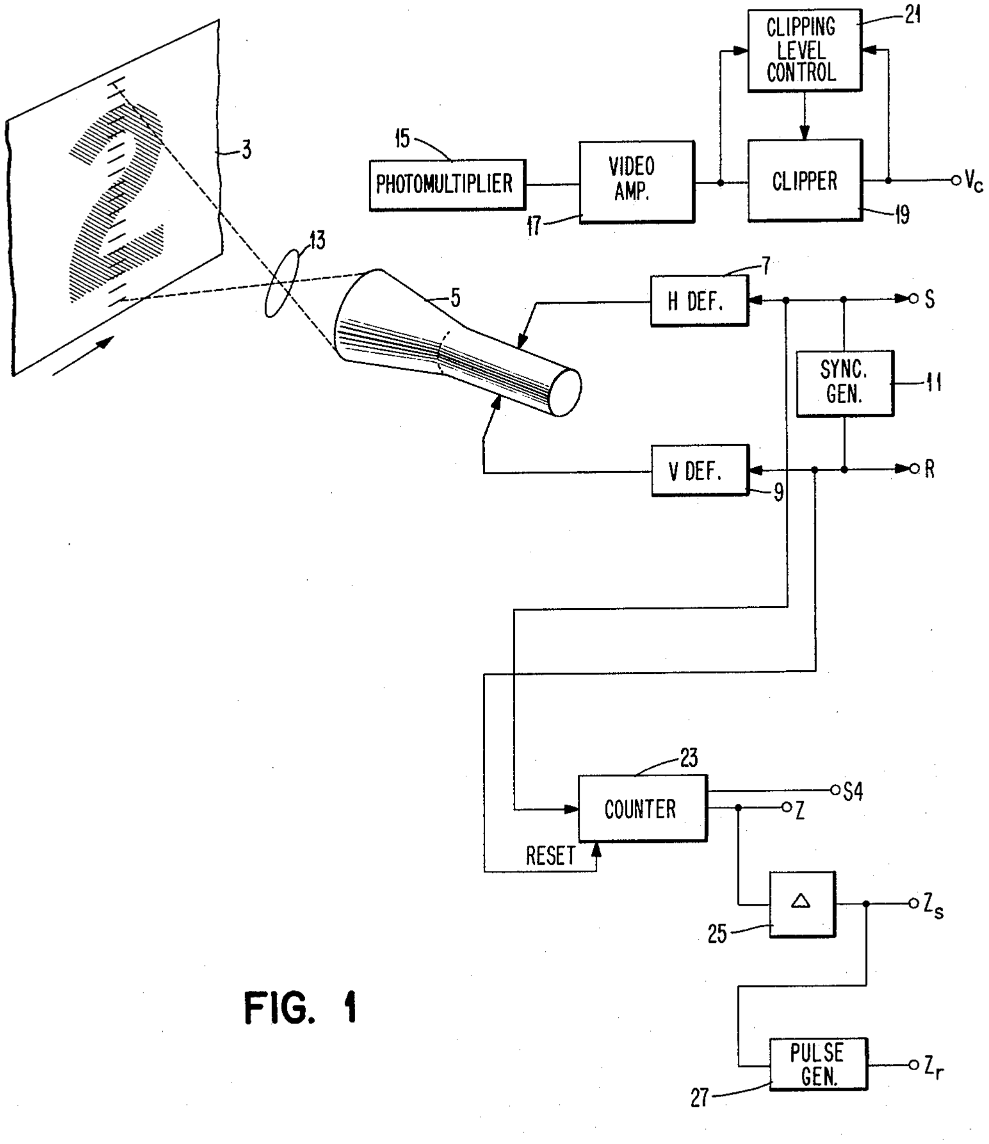
Fig. 1 is a diagrammatic view of a portion of a character recognition system, including the scanning and synchronizing apparatus, to which the present invention may be applied.

Referring now to Fig. 1, there is shown an arrangement including a flying spot scanner for scanning characters on a record medium for analysis and recognition. A document 3, having thereon characters to be analyzed, such as the character "2" shown in the drawing is moved, by document transport means not shown, past an analyzing or scanning station, in the direction shown by the arrow. At the scanning station, suitable means is provided for scanning the document and the characters thereon. For the purposes of this disclosure, a flying spot scanner is shown, comprising a cathode ray tube 5, with suitable horizontal and vertical deflection circuits 7 and 9 respectively, which are governed by suitable synchronizing means 11. The horizontal and vertical deflection circuits are arranged and synchronized so that the spot of the scanner sweeps out a succession of tall narrow rasters, each of which comprises a large plurality of short horizontal scans, each such scan being displaced vertically from the preceding scan. One such raster is seen in the drawing, as projected from the cathode ray tube and through a lens system indicated symbolically at 13, onto the surface of document 3. The characters are scanned by a plurality of adjacent tall narrow rasters preferably overlapped by a small predetermined interval.

The reflected variations in light resulting from the scanning operation are transduced by a photomultiplier 15 or other suitable device which is effective to change the variations in reflected light to electrical signals to provide trains of scanning or video signals which vary in accordance with the scanning of the character or the document background.

It should be noted that other forms of scanning known in the art can be employed to provide signals of the same nature. For example, the document can be steadily illuminated and a mechanical scanner of the Nipkow disc type interposed ahead of the photomultiplier to provide a similar type of scanning.

The video or scanning signals from the photomultiplier 15 are supplied to a video amplifier 17, which may be of conventional design and serves to amplify the signals to adequate levels for further use. The video signals are clipped by a suitable clipper 19, in turn governed by a clipping level control 21, the details of which form no part of the invention, but which are designed to clip the signals to predetermined values. These clipped signals are then supplied to a terminal $Vc$, for subsequent processing by the data consolidation system.

Fig. 1 also shows the necessary apparatus and connections for supplying timing or synchronizing pulses for the remainder of the system. The horizontal scan pulses are supplied to a terminal S and are used in other portions of the system for denoting a short interval starting just before the time of completion and ending at the time of completion of each short horizontal scan, and which corresponds to the overlap interval between rasters. Likewise, the vertical deflection pulses are supplied to a terminal R, and are employed in other portions of the system for indicating the completion of a vertical raster, including the so-called dead or flyback time.

The horizontal scan pulses are also supplied to the input of a counter 23, which may take any one of a number of well-known forms, which counter is reset at the end of each vertical raster by the vertical deflection flyback, and which then advances step-by-step in synchronism with each horizontal scan pulse. The counter is provided with two outputs, the first of which is supplied to terminal S4 and which comprises a pulse which exists for the entire scan time of the last of a predetermined number of horizontal scans, in the present example, four. In other words, from the start of every fourth horizontal scan to the end of that scan, the counter provides an output to terminal S4. The second output from the counter is a short pulse which occurs at the end of the last scan in each predetermined number of scans, in the example used herein, at the end of every fourth scan. This output is supplied to a terminal Z and to the input of a delay device 25, which may be a conventional electrical delay line, the output of which is supplied to terminal $Zs$ and to the input of a conventional pulse generator 27, which may take one of a number of well-known forms, the output of which is connected to terminal $Zr$. Accordingly, an output pulse is provided from terminal $Zs$ for each output from terminal Z, and the parts are arranged and proportioned so that each pulse $Zs$ rises shortly after the rise of pulse Z, and falls shortly after the fall of pulse Z. Also, when $Zs$ falls, the pulse generator 27 is turned on by the trailing or falling edge of pulse $Zs$ and remains on for a predetermined time, after which the pulse generator turns off. Accordingly, pulse $Zr$ occurs immediately following the termination of pulse $Zs$. These pulses are employed for sampling and resetting in portions of the system to be subsequently described.

Having thus described the manner in which the clipped video signals are obtained, and the appropriate timing signals which define the overlap of the short horizontal scans (S), the beginning and ending of adjacent consolidation intervals (Z), each composed of a predetermined plurality of short horizontal scans, and the end of each vertical raster of scans (R), reference will now be made to Fig. 2, which illustrates one embodiment of a data consolidation system in accordance with the invention.

The clipped video signals at terminal $Vc$ are supplied to three integrating circuits, 31, 33 and 35, which are reset at the end of each cell or consolidation interval by the Z pulse transmitted through OR circuit 37, and at the end of each raster by an R pulse supplied through OR circuit 37. The clipped video signals are supplied directly to the input of integrator 31, and via AND circuits 39 and 41 to integrators 33 and 35, respectively, these AND circuits being governed in a manner to be subsequently explained.

Integrator 31 integrates all of the black signals received during an interval or cell of scanning, and supplies an output signal which has a magnitude proportional to the entire black area seen during the scanning interval or cell. This output is supplied to two conventional clipping circuits 43 and 45. These clipping circuits are arranged so that an output signal will be supplied therefrom when and only when the magnitude of the input signal is above a predetermined value, determined by a clipping control voltage supplied to the clipping circuit from a preset voltage divider. In the case of clipping circuit 43, the associated voltage divider 47 is set to a value such that the clipping circuit 43 will provide an output signal when and only when the integrator output is of a value indicating that the total black area seen during a scanning interval is greater than a first or upper threshold value, for example 50 percent or more. In like manner, the voltage divider 49 associated with clipping circuit 45 is preset so that clipping circuit 45 provides an output when and only when the total black area seen during a scanning interval exceeds a second or lower threshold value, for example, 25 percent or more.

Figure 3A:
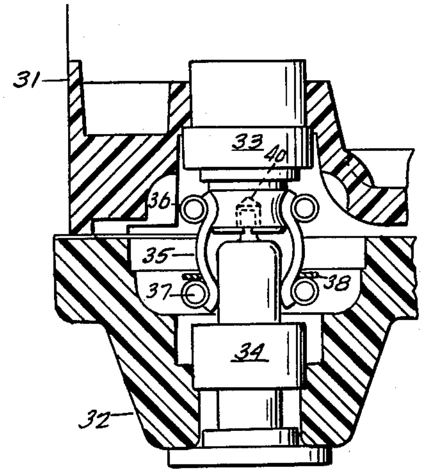
Fig. 3 is a diagrammatic view of a consolidated data storage matrix which may be used in conjunction with the present invention.
Figure 3B:
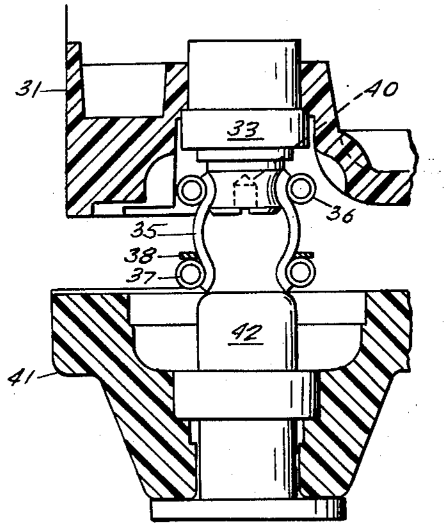

The outputs of clipping circuits 43 and 45 are supplied to storage devices such as the triggers 53 and 55, so that when the given upper threshold is exceeded, trigger 53 is set, and provides an output to one input of an AND circuit 57, the other input of which is connected to terminal Z. Accordingly, at the end of a consolidation interval, as indicated by the Z pulse, if the total black is greater than an upper threshold, an output signal is provided through AND circuit 57 and an OR circuit 59 to terminal V*s*, indicating that the total cell or interval is to be considered as black. The output from terminal V*s* is the consolidated data or information which is processed to determine the character which is being scanned, and is supplied to suitable recognition circuits which may include a dynamic storage matrix as shown in Fig. 3 and described henceforth.

If the total black accumulated during the consolidation interval is less than the upper threshold, but greater than the lower threshold, trigger 53 will not be set, and no direct output is produced. However, trigger 55 will have been set, and provides one input to an AND circuit 61, which has another input connected to terminal Z, and has its output connected to OR circuit 59 and thence to terminal V*s*. The third input of AND circuit 61 is connected to the output of an inverter 63. Thus, if the total black exceeds the second or lower threshold, but does not reach the upper threshold, the system is arranged so that additional criteria must be considered in making a decision as to whether the scanning interval will be considered black or white, and this additional criteria will then govern the conductive state of AND circuit 61 via inverter 63. The additional criteria employed in the arrangement shown in Fig. 2 are considerations of the amount of black along the leading vertical or horizontal edges of a character portion which is being scanned during the interval in question, and the decision made for the preceding horizontal or vertical adjacent cells or intervals.

Considering now the leading vertical edge criterion, the clipped video which occurs during S pulse time is gated via AND circuit 39 to integrator 33, which may be termed the leading vertical edge integrator. When the integrated value of the signals rises above a predetermined third threshold, for example, 15 percent, the clipper circuit 65 will provide an output to set trigger 67. At this time, if the preceding adjacent horizontal cell or scanning interval was deemed black, a signal will be present at terminal A*k*, provided by means to be later described. Coincidence of the trigger output and A*k* will supply a signal through AND circuit 69, and OR circuit 71, which signal is inverted by inverter 63 and accordingly inhibits AND gate 61. Therefore, it can be stated if the total black accumulated during a consolidation interval exceeds a lower threshold, and (*a*) the black accumulated in a defined fraction of the interval that extends along its leading vertical edge does *not* exceed a third threshold, or (*b*) the horizontally adjacent preceding interval is *not* black, then the present interval will be black, since if either of the latter two conditions do *not* exist, the third input to AND circuit 61 will not be inhibited and a sample output can be supplied via OR circuit 59 to terminal V*s*.

Next, considering the leading horizontal edge criterion, the clipped video signals are supplied to integrator 35, which may be termed the leading horizontal edge integrator, via AND circuit 41, which is governed by the output of a trigger 75. This trigger is set on by the first short horizontal scan pulse S during a consolidation interval, and remains on until the interval, or the entire raster is terminated, at which time it is set off by the Z or R pulse as the case may be. Accordingly only the signals seen while the trigger is off, i.e., during the first horizontal scan in an interval, will be integrated by integrator 35 since setting the trigger on cuts off the signal supplied from it to AND circuit 41. If these signals exceed a predetermined fourth threshold, say for example 15 percent or more, as determined by the clipping circuit 77, trigger 79 will be set. At this time, if the next vertically preceding cell was deemed black, a signal will be present at terminal A1, provided by means to be later described. Coincidence of the trigger output and A1 at the inputs of an AND circuit 81 will produce an output therefrom, which is supplied through OR circuit 71 and inverter 63 to inhibit AND circuit 61. Therefore under these conditions, it can be stated that if the total black accumulated during a consolidation interval exceeds a lower threshold and (*a*) the black accumulated in a defined fraction of the interval that extends along the leading horizontal edge does *not* exceed a fourth threshold, or (*b*) the vertically adjacent preceding interval is *not* black, then the present interval will be black, since if either of the latter two conditions do *not* exist, the third input to AND circuit 61 will not be inhibited and a sampled output can be supplied via OR circuit 59 to terminal V*s*.

The interval pulse Z, which is used for sampling the outputs of the intermediate storage triggers, or the R pulse which indicates the termination of a raster, will reset the integrators, as previously explained, and also control the resetting of the intermediate storage triggers, through a pulse generator 83, which turns on momentarily to reset the triggers off when the Z or R pulse terminates.

From the foregoing, it will be apparent that the data consolidation system as shown in Fig. 2 utilizes several criteria to determine the value, black or white, to be assigned to a given consolidation interval. If a first value of black is accumulated during the consolidation interval or cell, the output will be black, i.e., a signal will be supplied at terminal V*s* at Z pulse time. However, if only a second value of black, less than the first, is accumulated then the output signal at terminal V*s* will be present at Z pulse time only if the black accumulated along the leading edges is less than a predetermined amount, or if the respective adjacent cell was not black.

It has been pointed out above that the consolidated data from the adjacent cells or intervals is used, when necessary, in the consolidation of data for the present interval. Fig. 3 of the drawings illustrates one form of dynamic storage which will provide the necessary signals for the operation of the data consolidation system shown in Fig. 2.

The arrangement in Fig. 3 comprises a shifting register matrix in which the number of stages in each column A, B, . . . M is equal to the number of consolidation intervals in each raster, which is also greater than the maximum pattern height, and the number of columns is substantially equal to the number of rasters required to span the widest characters to be scanned. Each stage of the shifting register, therefore, corresponds to a single scanning or consolidation interval. All of the stages are connected in tandem with a common driving line connected to each stage and to terminal Z. Thus, with the input of the first stage in the first column connected to terminal V*s*, the consolidated scanning data will be entered in sequence at the first stage, at the top of column A, and progressively shifted through all of the succeeding stages in column A, thence to the first stage in the second column B, and so on through the remaining stages. Each stage is provided with an output terminal designated by the column and row for the stage, as shown by terminals A1, A2, . . . M*k*. These outputs are connected to suitable logic circuits, not shown, which when activated by the presence of information in particular stages, and/or the absence of information in other stages, provide an output indicative of the character scanned. Since the consolidated data for each scanning interval is passed through the shifting register in sequence, it is apparent that the output from any one or more of the stages will reflect the consolidated data from an interval which is previous in time to a present interval. In the present case, therefore, assuming that horizontally adjacent cells are $k$ intervals apart, the output $Ak$ will represent the horizontally adjacent cell of the present consolidation interval. Also, it will be obvious that A1 represents the previous adjacent vertical cell or interval, and hence the outputs A1 and $Ak$ when supplied to the data consolidation system of Fig. 2, provide information as to the consolidated data from the previous adjacent scan intervals, in both the horizontal and vertical directions, for use in the manner previously described.

It should be noted that for the first cell of a raster, A1 is *not* the previous adjacent vertical cell (since none exists); since the number of intervals or cells in a raster are greater than the character height, information can not exist in both the first cell of the raster and the last cell of the previous raster (i.e. A1) and therefore no confusion exists.

Obviously, other types of dynamic data storage, such as delay lines or movable recording mediums including magnetic drums, tapes or discs could be employed in the overall recognition system, and by providing suitably timed or spaced outputs, the appropriate previous information can be fed back to the data consolidation system.

It is readily possible to employ other variations of the invention by using different criteria or different combinations of criteria, all depending upon the minute examination of the contents of a scanning interval, together with the consolidated data for previous intervals and integrated data and sampled data from adjacent intervals. Another such embodiment is shown in Fig. 4.

Figure 4A:
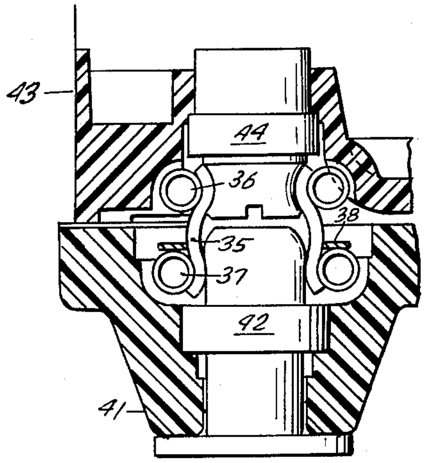
Fig. 4 is a diagrammatic view of a second embodiment of a data consolidation system in accordance with the present invention.
Figure 4B:
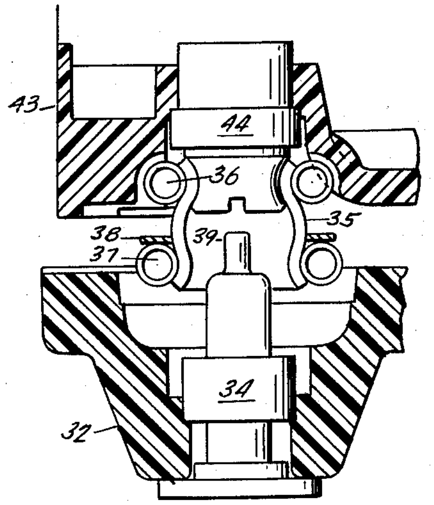
Figure 4:
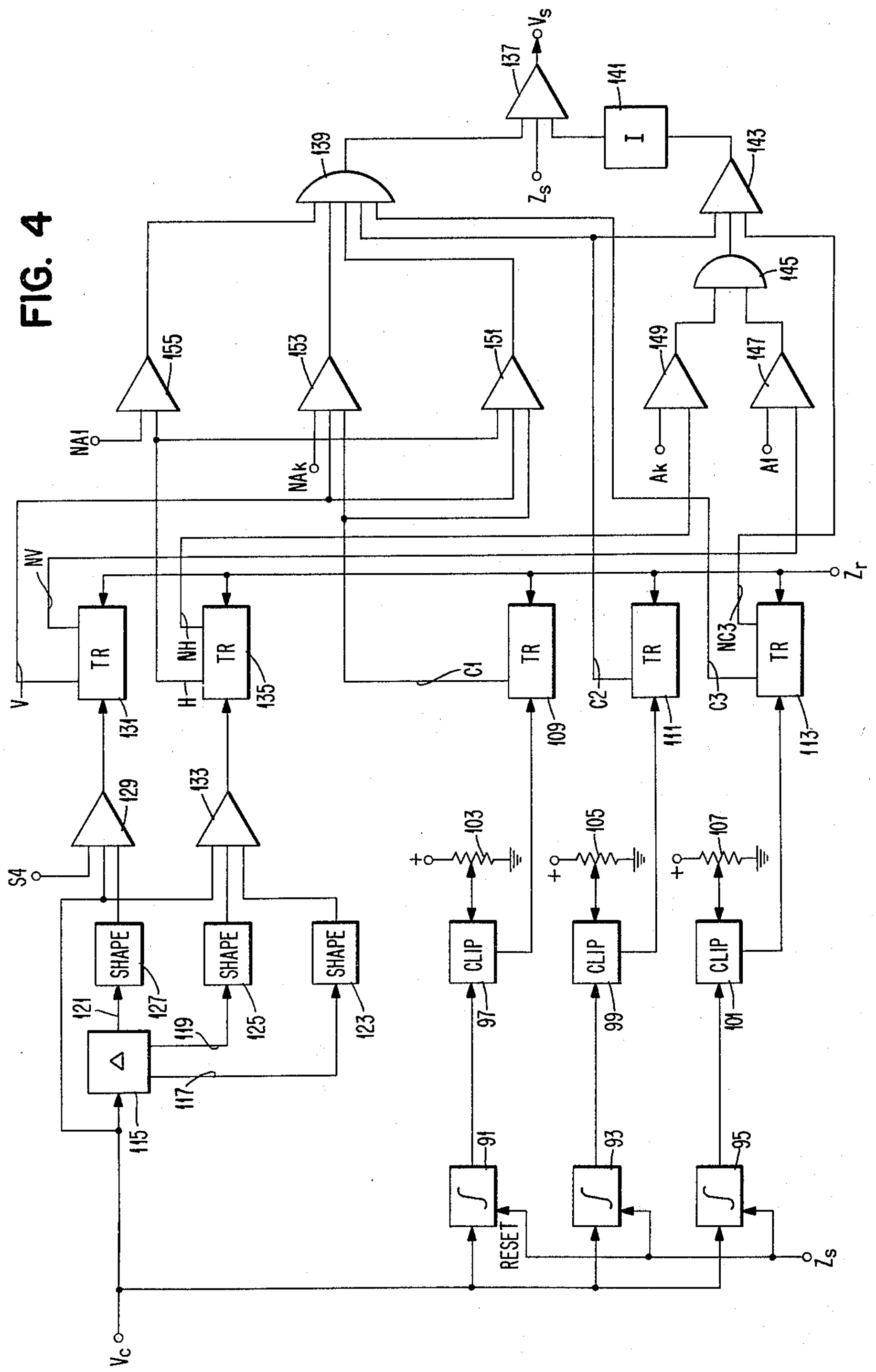

Referring to Fig. 4, the reference characters 91, 93 and 95 designate resettable integrators which have their inputs connected to terminal $Vc$ to receive the clipped video signals from the scanner portion of the overall system. The integrators are reset by the delayed zone pulse $Zs$, and have their outputs connected to associated clipping circuit 97, 99 and 101 respectively, the levels for clipping being set by the variable voltage dividers 103, 105 and 107, respectively. The outputs of clipping circuits 97, 99 and 101 are connected to the inputs of triggers 109, 111 and 113 respectively. It is apparent that one or more of the triggers 109, 111 and 113 will be set on in accordance with the percentage of total black accumulated during a scanning or consolidation interval, and will accordingly provide an output on the associated output lines C1, C2 or C3. For example, output C3 will be provided if the total accumulated black in an interval is 75 percent or more, output C2 will be energized if the total black is 50 percent or more, and output C1 will be provided if the total black is 25 percent or more. It can be seen therefore, that this portion of the apparatus provides signals indicative of the amount of total black seen by the scanning apparatus during each scanning interval.

To determine the horizontal and vertical criteria within a consolidation interval, the clipped video signals are supplied to a concidence circuit arrangement including a delay device 115, preferably an electromagnetic delay line, having two intermediate taps 117 and 119 in addition to the output 121, which are connected to the inputs of shaping circuits 123, 125 and 127 respectively, for reshaping the pulses to suitable form after such distortion as may occur during transmission through the delay device 115. The output signals from delay device 115, with the original input signal and the fourth scan pulse S4, are supplied to the inputs of an AND circuit 129. The total delay time through delay device 115 is substantially equal to one scan time, so that an output signal will be provided from AND circuit 129 during the fourth scan time in a consolidation interval only when a black signal existed at corresponding times, i.e., at the same distance horizontally during the third and fourth scans, thus indicating a vertical character portion existing somewhere in the third or fourth scans of a scanning interval or cell. The output of AND circuit 129 sets on a trigger 131, which has two outputs V and NV, energized when the trigger is on and off, respectively. Thus it can be seen that output NV will be energized until the fourth scan time, at which time NV will be deenergized and V energized if a vertical character portion has been scanned in the third and fourth scan within the present scanning interval.

The clipped video signals, and the shaped outputs from the intermediate taps of the delay device are supplied to the inputs of an AND circuit 133, the output of which governs the setting on of a trigger 135. The parts are proportioned and arranged so that a sequence of signals occurring during a given time on any one scan, or distributed within the same time period on two adjacent scans, will provide an output which sets on the trigger 135, thereby removing the signal on line NH and providing a signal on line H. In this manner, it is apparent that horizontal portions of a character scanned at any time during the scanning interval will be indicated by the presence of an H signal and the absence of the NH signal.

It can now be seen that the arrangement shown in Fig. 4, as thus far described, is effective to provide, during a consolidation interval which as pointed out before corresponds to four scans, a plurality of signals which define the amount of black seen during the interval, and also the relative direction of character portions seen during the interval. It now remains to provide a suitable output circuit which reflects the appropriate combinations of the criteria thus obtained with that obtained on prior adjacent consolidation intervals.

In considering the combinations of signals which will produce an output at terminal $Vs$, it should first be noted that both positive and negated conditions are employed. Thus the final output AND circuit 137 has three inputs including the zone interval sampling pulse $Zs$, a positive input supplied from the output of an OR circuit 139, and an inhibiting input from the output of an inverter 141. Inverter 141 is connected to the output of an AND circuit 143, so that if the inputs to this AND circuit are all present, no output can occur from AND circuit 137. The conditions for inhibiting output signals are (1) an indication of total black of greater than 50 percent and (2) an indication that total black was less than 75 percent, provided by the C2 and NC3 inputs respectively to AND circuit 143, and (3) when there is no vertical segment in the present interval and a black value exists for the preceding adjacent vertical interval, or when there is no horizontal segment in the present scan and a black value exists for the preceding adjacent horizontal interval. These latter conditions are detected by the circuit including an OR circuit 145 which has a first input from an AND circuit 147 which has inputs A1 and NV, thus checking the first way of obtaining condition (3), and a second input from an AND circuit 149 which has inputs $Ak$ and NH, thus checking the second way of obtaining condition (3).

Now considering the positive inputs to OR circuit 139, the first to be considered is C3. Under any conditions, the C3 signal will produce an output, since AND circuit 143 cannot possibly supply an inhibit if C3 is present, by virtue of the fact that NC3 is one of the required inhibit conditions. C2 will provide an output also, provided the conditions including the horizontal and vertical segment criteria do *not* indicate an inhibit condition from inverter 141.

The next condition for producing an output is that in which the total black is above the minimum threshold indicated by C1 but has not reached the second threshold indicated by C2. In this case, if horizontal and vertical character segments have been detected, so that H and V signals are provided, all inputs to an AND circuit 151 will be energized to supply an output to OR circuit 139. Also, if C1 is present together with V and NA*k*, indicating a vertical segment in the present scan interval, but no black for the previous horizontally adjacent interval, AND circuit 153 will provide an output to OR circuit 139.

The next and last combination for producing an output is presence of a horizontal segment in the present interval, and no black for the preceding adjacent vertical interval, indicated by H and NA1, which signals will produce an output from AND circuit 155 to OR circuit 139.

The negated values for the adjacent intervals are supplied by conventional inverters from the appropriate locations in the consolidated data storage, such as inverters 157 and 159 in Fig. 3.

The integrators 91, 93 and 95 are reset by the delayed zone pulse Z*s*, which also provides the sampled output to terminal V*s*, while the data consolidation intermediate storage triggers 109, 111, 113, 131 and 135 are reset by the further delayed pulse Z*r*.

In view of all of the foregoing, it can be seen that the present invention provides a novel arrangement for consolidating data obtained from a plurality of scanning intervals, each comprising a predetermined number of elemental scans, by including means for determining a plurality of different threshold values for the total signals produced by scanning portions of the pattern within the present interval, means for determining the presence and direction of portions of patterns scanned during the interval, and means for combining the signals thus provided with the consolidated data obtained during one or more previous scan intervals, to provide a consolidated data value for the present scan interval.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. A data consolidation system for a pattern recognition system in which patterns are scanned by scanning means which provides a plurality of scanning configurations, each configuration comprising a plurality of data consolidation intervals and each interval including at least one elemental scan, comprising first means connected to said scanning means for deriving signals representative of integrated values of pattern areas and sampled values of pattern areas within a present consolidation interval, second means connected to said scanning means for deriving signals representative of integrated pattern areas and sampled values of pattern areas within at least one adjacent consolidation interval, third means for providing signals representative of consolidated data for previous consolidation intervals, and logic means for combining the signals provided by said first, said second, and said third means to thereby provide a consolidated data output for the present consolidation interval.

2. A data consolidation system for a pattern recognition system in which patterns are scanned by scanning means which provides a plurality of rasters, each raster comprising a plurality of scanning intervals, and each interval comprising a predetermined number of elemental scans, comprising integrating means connected to receive scanning signals from the scanning means and effective to provide an integrated signal output proportional to the total area of pattern scanned during any scanning interval, amplitude responsive means connected to said integrating means for providing a consolidated data output signal when the amplitude of the integrated signal exceeds a predetermined relatively high value, and other means for providing a consolidated data output signal when said amplitude is less than said predetermined value, said last-named means being governed in accordance with the consolidated data output signal value for a previous scanning interval.

3. A data consolidation system for a pattern recognition system in which patterns are scanned in two coordinates by scanning means which scans a pattern with successive rasters each comprising a plurality of scanning intervals, each of said scanning intervals comprising a predetermined number of elemental scans, comprising integrating means connected to receive scanning signals from said scanning means and effective to provide an integrated signal output proportional to the total area of pattern scanned during any scanning interval, amplitude responsive means connected to said integrating means for providing a consolidated data output signal when the amplitude of the integrated signals exceeds a predetermined value, and other means for providing a consolidated data output signal when said amplitude is less than said predetermined value, said last-named means being governed in accordance with the consolidated data output signal values for previous scanning intervals in both of said coordinates.

4. A data consolidation system for a pattern recognition system for consolidating data supplied by scanning means which provides scanning signals for a plurality of scanning intervals, each scanning interval including a predetermined number of successive scans, comprising, in combination, a plurality of integrating circuits connected to said scanning means for integrating the scanning signals occurring during each of said intervals, threshold means associated with each of said integrating circuits, for establishing a plurality of different thresholds for the integrated scanning signals, storage means associated with each of said threshold means for storing an indication that the integrated signals supplied to the threshold means has equaled or exceeded a predetermined value, an output circuit, and sampling means effective at the end of each of said intervals for supplying an output signal to said output circuit in accordance with the indications stored in said storage means.

5. A data consolidation system for a pattern recognition system in which patterns are scanned by scanning means which provides a plurality of rasters, each raster comprising a plurality of scanning intervals, and each interval comprising a predetermined number of elemental scans, comprising integrating means connected to receive scanning signals from the scanning means and effective to provide an integrated signal output proportional to the total area of the patterns scanned during any scanning interval, amplitude responsive means connected to said integrating means for inhibiting a consolidated data output signal when the amplitude of the integrated signal is less than a predetermined value, and logic means for providing a consolidated data output signal when said amplitude is greater than said predetermined value, said logic means including first means for deriving signals representative of integrated values of pattern areas and sampled values of pattern areas within a present consolidation interval, second means connected to said scanning means for deriving signals representative of integrated pattern areas and sampled values of pattern areas within at least one adjacent consolidation interval, and third means for providing signals representative of consolidated data for previous consolidation intervals.

6. A data consolidation system for a pattern recognition system, for consolidating data supplied by scanning means which provides scanning signals for a plurality of scanning intervals, each scanning interval including a predetermined number of successive scans, comprising, in combination, threshold means operatively connected to said scanning means and effective for selectively providing a plurality of signals each indicative of a different predetermined total accumulation of pattern signals obtained during a given scanning interval, first circuit means associated with one of said threshold means for determining the presence of pattern portions aligned in one scanning coordinate, second circuit means for providing a signal indicative of the consolidated data value provided on a previous scanning interval, and an output circuit connected to said threshold means and said first and said second circuit means and effective to provide a consolidated data output signal reflecting the condition of said threshold means and said first and said second circuit means, whereby the consolidated data signal for any interval depends upon the total accumulation of character signals during the interval, the presence of aligned character portions, and the data signal for a previous interval.

7. A data consolidation system for a pattern recognition system in which patterns are scanned by scanning means, in a succession of short scans in one coordinate, displaced successively in another coordinate in a scanning raster, a predetermined number of scans constituting a scanning interval, the pattern recognition system including data storage means for utilizing consolidated data for pattern analysis, the consolidation system comprising, in combination, first threshold responsive means connected to said scanning means and responsive to the total pattern area scanned during a scanning interval to provide a first threshold signal when said pattern area exceeds a first high threshold value and to provide a second threshold signal when the pattern area exceeds a second low threshold value, second threshold responsive means connected to said scanning means and responsive to the pattern area scanned in each cell along one edge thereof to provide an edge signal when the scanned area of this edge exceeds a predetermined value, output circuit means energized by said first threshold signal, and by said second threshold signal in the absence of an edge signal from said second threshold responsive means and in the absence of a signal from said data storage means for the previously scanned interval adjacent said edge.

8. In a pattern recognition system including scanning means which scans the patterns to be recognized by a succession of short scans in one coordinate displaced successively in another coordinate in a scanning raster, a predetermined number of scans constituting a scanning interval, synchronizing means for providing timing signals synchronized with the scanning means, and consolidated data storage means for utilizing consolidated scanning data for pattern analysis, a data consolidation system comprising, in combination, a first, a second and a third threshold determining means, each comprising an input circuit, integrating means connected to said input circuit and provided with a reset governed by said synchronizing means to reset the integrators at the end of each scanning interval, clipping circuit means connected to said integrating means and effective to provide a threshold output signal when the integrated value of the signals supplied to said integrator exceeds a predetermined value, an output circuit for said data consolidation system for supplying the consolidated data signals to said data storage means, means for connecting the input of said first threshold determining means to said scanning means and the output circuit to the clipping circuit means to provide an output signal when the total integrated data exceeds a first threshold value, switching means governed by said synchronizing means for connecting the inputs of said second and third threshold determining means to said scanning means to receive only the scanning data occurring during the scanning of selected edges of each scanning interval to provide output signals when the integrated data for the said selected edges of the scanning interval exceeds a predetermined value, and other switching means for combining the selected edge data for a present interval with the consolidated data for the previous intervals supplied from said data storage for inhibiting the output circuit for the data consolidation system when the total integrated data is less than said first threshold value.

9. In a pattern recognition system including scanning means which scans the patterns to be recognized by a succession of short scans in one coordinate displaced successively in another coordinate in a scanning raster, a predetermined number of scans constituting a scanning interval, synchronizing means for providing timing signals synchronized with the scanning means, and consolidated data storage means for utilizing consolidated scanning data for pattern analysis, a data consolidation system comprising, in combination, a plurality of threshold determining means connected to said scanning means for providing different threshold signals in accordance with the integrated values of the total scanning data supplied from said scanning means exceeding predetermined values pattern segment detecting means connected to said scanning means for determining the presence of pattern segments in each interval aligned substantially with said coordinates, prior data indicating means for indicating the values of consolidated data in prior scanning intervals, an output circuit for said data consolidation system and switching means governed by said threshold determining means, said pattern segment detecting means, and said prior data indicating means for supplying an output signal to said output circuit in accordance with the total accumulated scanning signals in a scanning interval, the presence of pattern segments in the scanning interval, and the value of the consolidated data for the previous intervals.

10. In a pattern recognition system including scanning means for scanning patterns to be recognized by a plurality of short scans in one coordinate successively displaced in another coordinate to form a scanning raster, each scanning raster comprising a plurality of scanning intervals including a predetermined number of said short scans, synchronizing means for providing timing signals synchronized with said scanning means, and consolidated data storage means for utilizing consolidated scanning data for analysis, a data consolidation system comprising, in combination, pattern segment determining means connected to said scanning means and effective to provide output signals indicative of the presence of pattern segments in said scanning intervals aligned with at least one of said coordinates, threshold responsive means connected to said scanning means and effective to provide a plurality of different threshold signals in accordance with the total value of pattern area scanned during a scanning interval, storage means for storing the outputs of said pattern segment determining means and said threshold responsive means, a consolidated data output circuit, and logic means for combining the outputs of said storage means and outputs of said consolidated data storage means to energize said consolidated data output circuit.

References Cited in the file of this patent

UNITED STATES PATENTS 2,889,535 Rochester ------------- June 2, 1959

OTHER REFERENCES

"Character Recognition for Business Machines," by Glauberman, "Electronics," February 1956, pp. 132 to 136.